(12) United States Patent
Karpov et al.

(10) Patent No.: US 6,811,114 B2
(45) Date of Patent: Nov. 2, 2004

(54) APPARATUS FOR LAUNCHING HEAVY LARGE PAYLOADS FROM AN AIRCRAFT

(75) Inventors: Anatoly Stepanovich Karpov, Kropotkina (RU); Robert Konstantinovich Ivanov, Mytischi (RU); Jury Vladimirovich Monakhov, Korolev (RU); Mikhail Markovich Kovalevsky, Moscow (RU); Andrey Vladimirovich Borisov, Korolev (RU); Boris Alexandrovich Polyakov, Moscow (RU); Sergey Semovich Mashurov, Moscow (RU)

(73) Assignee: Joint Stock Company Aircompany Polet, Voronezh (RU)

( * ) Notice: Subject to any disclaimer, the term of this patent is extended or adjusted under 35 U.S.C. 154(b) by 0 days.

(21) Appl. No.: 10/467,477

(22) PCT Filed: Jan. 17, 2002

(86) PCT No.: PCT/RU02/00009

§ 371 (c)(1),
(2), (4) Date: Oct. 16, 2003

(87) PCT Pub. No.: WO02/062662

PCT Pub. Date: Aug. 15, 2002

(65) Prior Publication Data

US 2004/0065779 A1 Apr. 8, 2004

(30) Foreign Application Priority Data

Feb. 7, 2001 (RU) ........................................ 2001103238

(51) Int. Cl.$^7$ ................................................ B64C 1/02
(52) U.S. Cl. .................. 244/63; 244/118.1; 244/137.1; 89/1.816
(58) Field of Search ............... 244/158 R, 137.1–137.3, 244/63, 138 R, 2, 118.1; 89/1.81–1.818, 1.51

(56) References Cited

U.S. PATENT DOCUMENTS

| | | | |
|---|---|---|---|
| 2,938,430 A | | 5/1960 | Pion |
| 2,977,853 A | * | 4/1961 | Gehrkens et al. ............. 89/1.51 |
| 3,135,161 A | * | 6/1964 | Oyhus ........................ 89/1.818 |
| 3,160,061 A | * | 12/1964 | Moy ........................... 89/1.816 |
| 4,040,334 A | * | 8/1977 | Smethers, Jr. ............. 89/1.804 |
| H405 H | * | 1/1988 | Covey ....................... 89/1.816 |
| 4,739,027 A | * | 4/1988 | Mendelsohn et al. ......... 528/60 |
| 5,168,119 A | * | 12/1992 | Sands ........................ 89/1.816 |
| 5,190,246 A | | 3/1993 | Mac Conochie |
| 5,279,199 A | | 1/1994 | August |
| 5,438,905 A | * | 8/1995 | Matheson et al. ......... 89/1.816 |
| 6,260,802 B1 | * | 7/2001 | Hampsten ................. 244/137.1 |
| 6,394,392 B1 | * | 5/2002 | Lafferty ................... 244/118.1 |

FOREIGN PATENT DOCUMENTS

| | | |
|---|---|---|
| RU | 2068169 C1 | 10/1996 |
| RU | 2096261 C1 | 11/1997 |
| RU | 2160215 C1 | 12/2000 |

* cited by examiner

*Primary Examiner*—Galen Barefoot
(74) *Attorney, Agent, or Firm*—Burns, Doane, Swecker & Mathis, L.L.P.

(57) ABSTRACT

The invention relates to the aerospace engineering and can be used for jettisoning boost rockets from an aircraft. The inventive device comprises a landing container (3) with an open end (4) provided with a high-pressure source (5). The freight to be jettisoned (2) is arranged in two sections inside the container (3) on mounting elements (10), one of which is embodied in the form of a calibrated support (9). The values of maximum efforts and acceptable lateral movements (13) of the supports (9) are chosen in such a way that a minimum positive allowance (12) between the container (3) and the freight (2) is provided. The supports (9) are provided with dampers. The aim of the invention is to reduce a transverse load affecting the freight to be jettisoned landing.

4 Claims, 4 Drawing Sheets

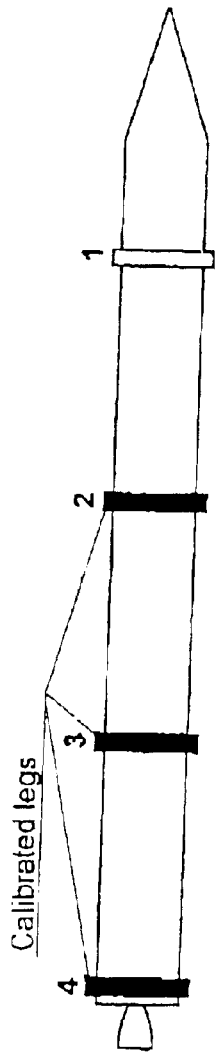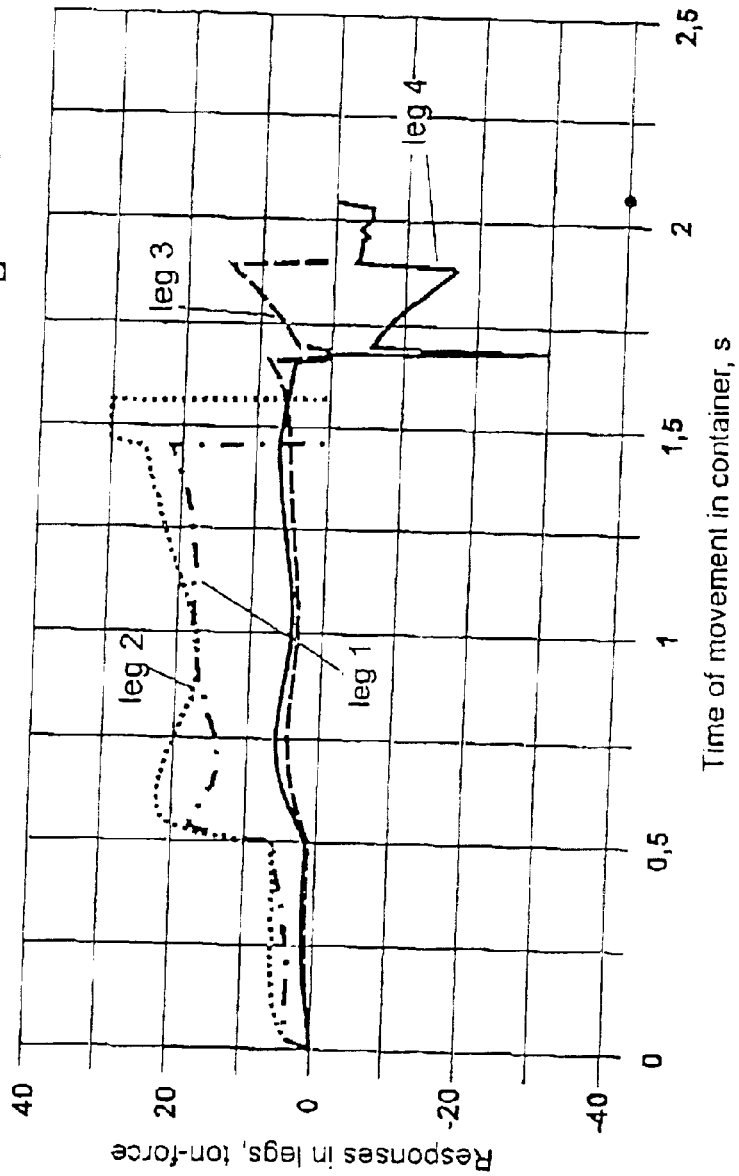
Fig. 3

APPARATUS FOR LAUNCHING HEAVY LARGE PAYLOADS FROM AN AIRCRAFT

BACKGROUND OF THE INVENTION

1. Field of the Invention

The present invention relates to aerospace engineering and is applicable in launching missile vehicles and other heavy large payloads from aircraft to urgently deliver them to remote parts of the Earth and the ocean.

2. State of the Art

Conventional apparatuses for launching missile vehicles from an aircraft use extraction parachutes.

By way of example, in 70th the U.S.A carried out launching mock-ups and Minitmen-1, ICBMs removed from the weaponry, from S-5A military aircraft to demonstrate the air-basing capabilities thereof (Rocket and Space Engineering, 1974, No. 6, pages 1 to 6). A missile on a special take-off platform was mounted on roll-tables in the freight compartment of the S-5A aircraft. The platform with the missile was released through the rearward port of the aircraft by two extraction parachutes. The parachute deployment and extraction of the missile from the freight compartment took more than 6–8 seconds. After a lapse of time from the release of the platform with the missile from the aircraft, hoop-stress bands holding the missile on the platform were broken, and the platform with the extraction parachutes attached thereto was disengaged from the missile.

A similar technical solution was suggested in RU Patent No. 2,068,169 C1, IPC[6] F41F 3/06 by V. P. Makeev GRC company, involving a method for firing a missile from an aircraft. The method comprises the steps of: drawing a missile laid on a platform together with the platform from the freight compartment of an aircraft by extraction parachutes; separating the platform from the missile and taking it away by the same extraction parachutes.

Disadvantages of the prior art launching apparatuses include the necessity to use special platforms and extraction parachutes, which are expandable. In light of physical constraints imposed on the maximum weight launched from a given aircraft (constraints on the extraction parachute force, aircraft controllability, the aircraft structural strength in the "doorstep" region of the launching hatch), the weight portion of the payload to be launched will be always smaller then that maximum possible one per the weight of the platform. This prohibits e.g. the provision of maximum load-carrying capacity to put into orbit for the air-start missile vehicles launched from an aircraft. A significant disadvantage of the prior art methods is the necessity to provide new large extraction parachutes or unreliable multi-canopy systems made of the existing extraction parachutes for such heavy payloads.

A known aerospace system taught in RU Patent No. 2,160,215, IPC[7] B64G 1/00, 1/14, F41F 3/06, comprises a missile vehicle located in a transport/launching container. The transport/launching container is mounted inside the aircraft fuselage, has an open end to release the missile vehicle, and a pneumatic expulsion mechanism, such as a pressurization source, connected via locking accessories to an air-tight pneumatic chamber between a dead end of the transport/launching container and an end of the missile vehicle.

Most closely related to the present invention is an apparatus taught in U.S. Pat. No. 5,279,199, IPC[6] F41F 3/06, B 64D 1/04 of Hughes Aircraft Company for rearward launching (expulsion) of a missile, comprising a launch tube in which the missile is mounted, and means for expelling the missile, said missile expulsion means being an airbag with means for pressurizing the airbag.

In launching payloads, the prior arts taught in RU 2,160, 215 and U.S. Pat. No. 5,279,199 do not use expansive dispensable elements, such as platforms and extraction parachutes described above, and provide fast expulsion of heavy payloads from the aircraft. By way of example, according to RU No. 2,160,215 to expel a 100 ton missile vehicle of 3 m in diameter from the freight compartment of AN-124-100 "Ruslan" heavy military aircraft in 2 seconds, the pressure in the transport/launch compartment must be about 1.5 gage atmosphere. In this case, the force to expel the missile vehicle will be about 100 ton-force at the longitudinal load factor of about unity and the relative speed of about 30 m/sec at the instant when the payload leaves the container.

The problems with the above prior arts include considerable lateral loads (responses) acting on the payload to be launched from the mounting members. The lateral loads become especially great at the instant of leaving the launching container by the payload being launched, when part of the mounting members have already left the container, and all the inertia forces acting of the payload being launched are concentrated on the mounting members remaining in the container. In addition, at the final step of the payload exit from the launching container, e.g. when two belts of the mounting members remain in the container, the payload being launched can be wedged or undergo inadmissibly increased loads from the mounting members.

With heavy large payloads to be launched, such as missile vehicles, the great lateral loads necessitate strengthening the missile vehicle structure, which increases the weight thereof, reduces the load-carrying capacity and raises the specific cost of the payload launched.

OBJECTS AND SUMMARY OF THE INVENTION

The objects of the present invention are to reduce lateral loads acting on heavy large payloads when they are launched from an aircraft, therefore, reduce the structural mass of the payloads, such as missile vehicles, increase their load-carrying capacity and reduce the specific cost of launching the payload, as well as provide the aircraft and its crew safety at the launching stage.

The object of the invention are accomplished in an apparatus for launching heavy large payloads from an aircraft, comprising a launching container with an open end, a pneumatic expulsion device for expelling a payload from the container through the open end, a pressurization source, wherein the payload to be launched is located inside the launching container on mounting members that are placed on at least two belts of the payload to be launched. At least one of the mounting members is a calibrated leg. Maximum force adjustment values and admissible lateral displacements of the legs are selected so that to maintain a guaranteed clearance between the launching container and the payload when it is launched from the container.

The mounting members are secured on either the payload to be launched or the launching container.

In the embodiment with the mounting members secured on the payload to be launched, the calibrated legs are maximum distant from the open end of the launching container.

In the embodiment with the mounting members secured on the launching container, the calibrated legs are located on the belts maximum close to the open end of the launching container.

To damp vibrations in the calibrated legs and reduce dynamic structural loading on the payload to be launched, the calibrated legs comprise dynamic vibration dampers for damping dynamic vibrations of the payload being launched when it leaves the launching container.

BRIEF DESCRIPTION OF THE DRAWINGS

In the accompanying drawings:

FIGS. 3 and 4 show responses and displacements of the mounting members, including the calibrated legs, on an example of launching a 100 ton missile vehicle from AN-124-100 "Ruslan" heavy military aircraft.

DETAILED DESCRIPTION OF PREFFERED EMBODIMENT

Figure 1:
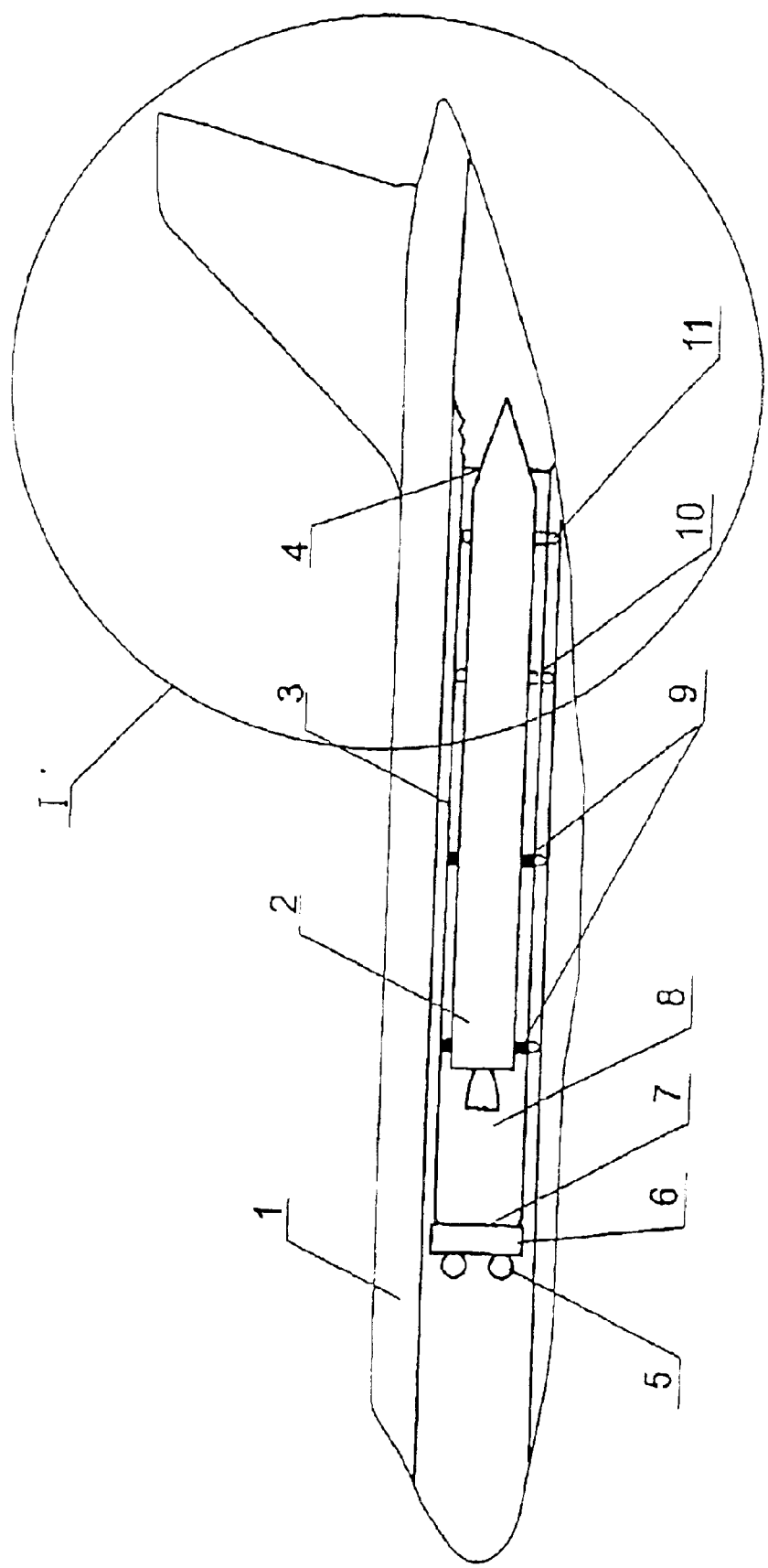
FIGS. 1 and 2 show an aircraft 1; a payload 2 to be launched; a launching container 3; an open end 4 of the launching container; a pressurization source 5; a pneumatic expulsion device 6; a dead end 7 of the launching container; an air-tight pneumatic chamber 8; calibrated legs 9; mounting members 10; units 11 for mounting the launching container in the aircraft freight compartment; a guaranteed clearance 12 between the launching container structure and the payload to be launched; admissible lateral displacements 13 of the calibrated legs.
Figure 2:
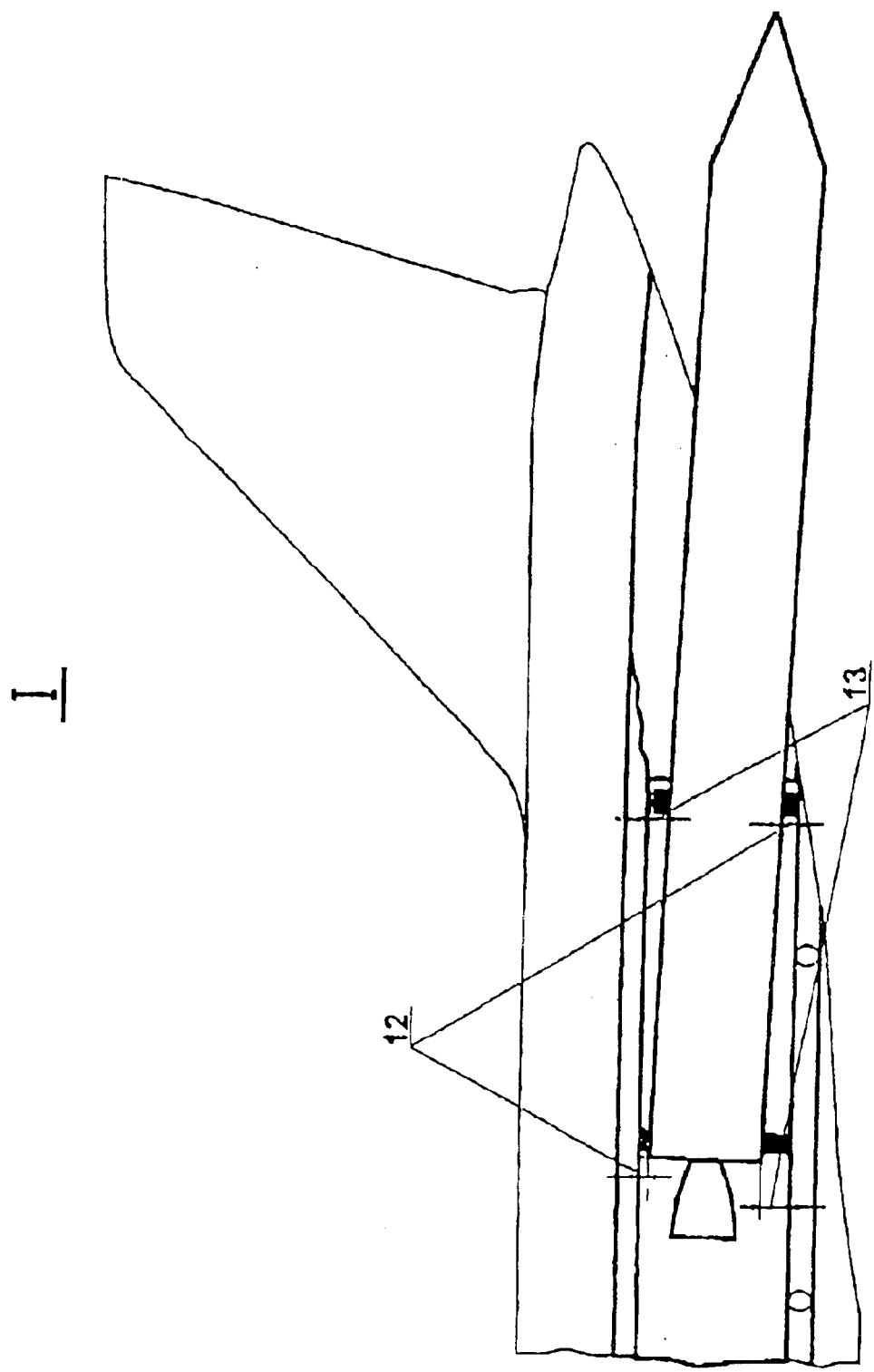

FIGS. 1, 2, 3 and 4 illustrate an embodiment of securing the mounting members on a payload to be launched. The calibrated legs are located on the belts maximum distant from an open end of the launching container.

In accordance with the present invention, an apparatus for launching heavy large payloads 2 from an aircraft 1 comprises a launching container 3 with an open end 4, a pneumatic expulsion device 6 for expelling a payload from the container 3 through the open end 4, and a pressurization source 5. The payload 2 to be launched is located inside the launching container 3 on mounting members 10 disposed on at least two belts of the payload 2 to be launched. At least one of the mounting members 10 is a calibrated leg 9.

The calibrated legs 9 are located on the belts of maximum distant from the open end 4 of the launching container 3, if the mounting members, including the calibrated legs, are secured on the payload 2 to be launched. In another embodiment, with the mounting members 10, including the calibrated legs 9, secured on the launching container 3, the calibrated legs 9 are arranged on the belts maximum close to the open end 4 of the launching container 3.

Therefore, in any embodiment of attachment of the mounting members 10—to the payload 2 to be launched or the launching container 3—the condition must be fulfilled at which the payload 2 in the process of exiting the launching container 3 has the calibrated legs 9 as the last retaining mounting members.

Maximum force adjustment values and permissible lateral displacements 13 of the calibrated legs 9 are selected so that to maintain a guaranteed clearance 12 between the structure of the launching container 3 and the payload 2 in the process of exiting the payload from the launching container through its open end 4.

Ejection of the payload 2 to be launched from the launching container 3 is performed under the effect of the pneumatic expulsion device 6 having a pressurization source 5. The pressure to expel the payload is applied to an airtight pneumatic chamber 8 between the dead end 7 of the launching container and the payload 2 to be launched.

The launching container 3 is mounted on the load-carrying floor of the freight compartment of the aircraft 1 using the mounting units 11 which sense both lateral and longitudinal loads, so that the aircraft 1 would sense a response (return) from the pressure in the air-tight pneumatic chamber 8.

An apparatus for launching heavy large payloads from an aircraft in accordance with the invention functions as follows.

At a target time for launching the payload 2, pressure is applied to the airtight pneumatic chamber 8 between the dead end 7 of the launching container and the payload 2 to be launched from the pneumatic expulsion device 6 having a pressurization source 5.

As a design overpressure has been attained in the airtight pneumatic chamber 8, the payload 2 to be launched detaches from the launching container 3 and under the gas pressure starts exiting through the open end 4 of the launching container 3.

As the payload 2 to be launched travels inside the launching container 3, all the inertia forces acting on the payload and frictional forces are perceived by the mounting members 10. Responses from the mounting members load the structure of the launching container 3 and the payload 2 to be launched, respectively.

As the payload 2 exits the launching container 3, the mounting members 10 one after another leave the container (if they are secured on the payload to be launched), and the inertia forces of the payload and frictional forces are perceived by the mounting members remained in the container. With reduction in the number of the mounting members 10, forces (responses) in them increase; hence the structural load of the launching container and the payload increases as well.

To reduce the inertial load on the payload 2 launched and the container 3, launching can be effected in the "hill" type flying mode of the aircraft, when the normal acceleration acting on the aircraft is close to zero (the mode close to zero gravity).

However, in the "hill" type flying mode, the aircraft 1 rotates in the vertical plane at the angular velocity $$\omega \approx (a_y - g)/V$$

where $\omega$ is the rotational speed of the aircraft in the vertical plane;

$a_y$ is the normal acceleration acting on the aircraft in the vertical plane;

V is the flight speed of the aircraft;

$g \approx 9.81$ m/sec$^2$ is the gravitational acceleration.

To provide the close to zero gravity flight mode ($a_y \approx 0$) of a heavy transport aircraft such as AN-124-100 "Ruslan", the aircraft rotational speed in the vertical plane will be about $$\omega \approx g/V = -9.81/180 = -0.055 \text{ 1/sec} = -3°/\text{sec}.$$

With such an angular rotational speed of the aircraft and the exit speed of the payload 2 from the launching container 3 of about 30 m/sec, there arises the Coriolis acceleration:

$$a_c = \omega \cdot W = -0.055 \cdot 30 \approx -1.7 \text{ m/sec}^2,$$

where $a_c$ is the Coriolis acceleration;

W is the exit speed of the payload from the launching container.

The Coriolis acceleration forces the payload 2 to be launched against the launching container 3 and creates additional forces on the last remaining mounting members 10, hence, on the structure of the payload 2 to be launched and the launching container 3.

Mathematical modeling of a process of launching of a missile vehicle from AN-124-100 "Ruslan" has shown that when the mounting members have rigid, non-adjustable legs, the loads on the last legs when the payload leaves the launching container, inadmissibly increase;

the loads on the last mounting members can be reduced using at least one calibrated leg. The calibrated legs must operate as the last ones on the path of the payload from the launching container. Maximum force adjustment values and existing lateral displacements in the legs were selected so that the forces on the legs be minimal, and the displacements provide a guaranteed clearance between the launching container structure and the payload to be launched.

Figure 4:
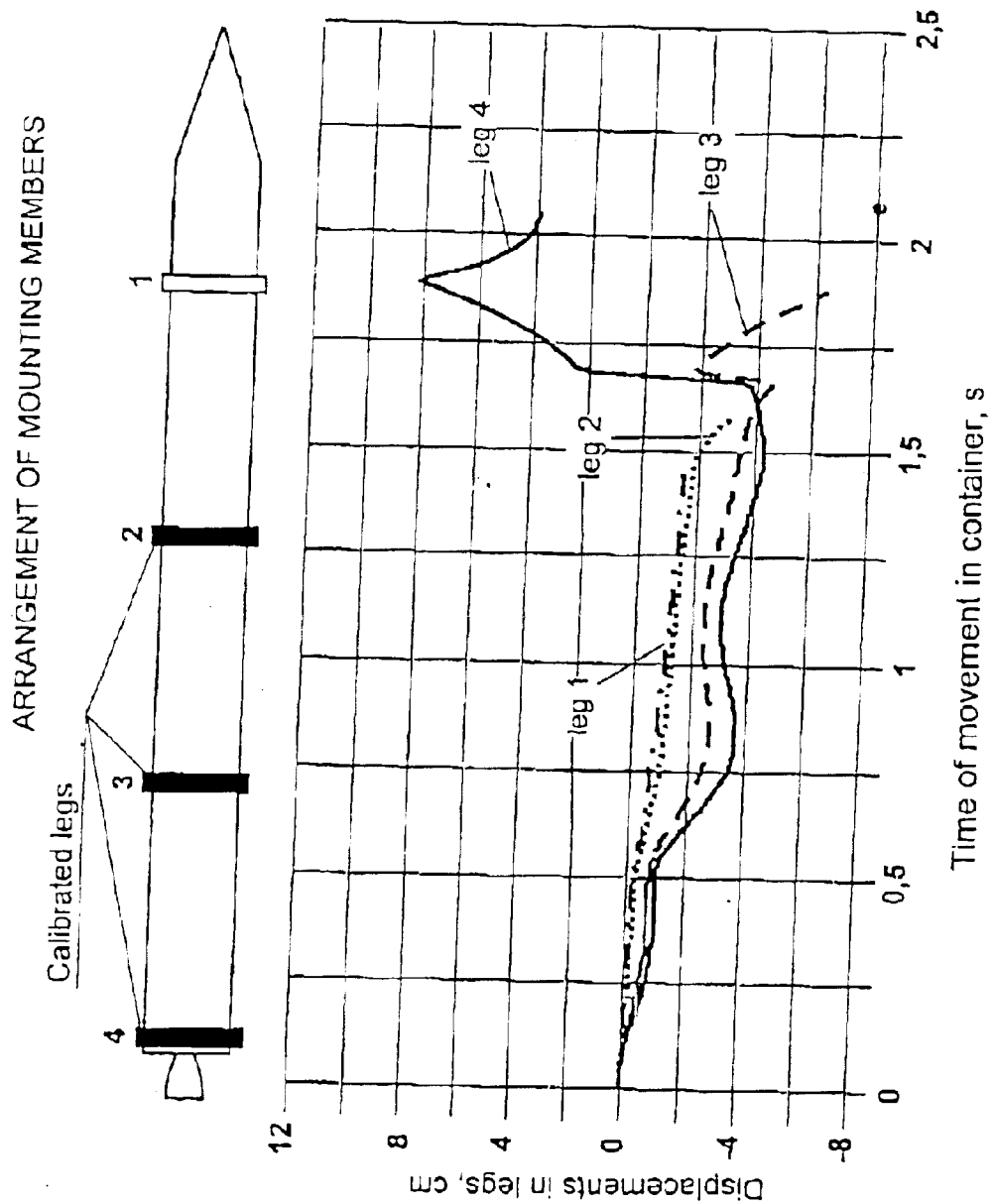

By way of example, FIGS. 3 and 4 illustrate simulation results (responses and displacements in the legs) for a 100 ton missile vehicle with a length of about 30 m and a diameter of 3 m. There are 4 mounting members, 3 of them being calibrated legs with maximum 30 ton-force. The missile vehicle exits the launching container at a speed of about 30 m/sec.

The simulation was based on the "hill" type flight of the aircraft at a vertical load factor in the range of 0.2±0.1 and with account of wind perturbations acting on the aircraft.

As seen in FIG. 4, maximum displacements occur at the last calibrated leg. The displacements do not exceed 8 cm.

It should be noted that when the payload leaves the launching container, the exit of each mounting member from the launching container is accompanied by actually instant redistribution of responses in the mounting members remaining in the launching container. This effect resembles an impact against the mounting member, which starts to experience, depending on its rigidity, fast lateral vibrations resulting in additional dynamic structural loading of the payload and the launching container.

Substantial vibrations may appear in the calibrated legs when the forces acting on them reach the maximum adjustment values, and the next leg exited the container with significant redistribution of responses.

To eliminate such a dynamic structural loading on the payload to be launched and the launching container, the calibrated legs must have mechanical or other dampers. The damper power is selected so that to provide effective damping of vibrations in the calibrated leg.

After leaving the launching container, the payload launched can require stabilization to provide a predetermined orientation thereof or to impart an acceleration force in a predetermined direction in order to separate fluids in cavities of the payload, e.g. to separate propellant components in propellant tanks of the missile launched.

The task of stabilization of the payload after launching thereof can be solved by the use of parachutes introduced in the main flow during or after the process of exiting the launching container by the payload. The stabilizing parachutes may be VSP-14 extraction parachutes commercially produced in Russia and used in military/transport aviation for landing heavy freights.

The advantages offered by the present invention include:

reduced lateral structural loads on the payloads launched from the aircraft;

reduced structural mass of the payloads;

enhanced load-carrying capacity of such payloads as missile vehicles owing to the reduced structural mass thereof, and reduced specific cost of launching the payload;

the aircraft and its crew safety owing to a guaranteed clearance provided between the payload and the container, hence, impact-free separation thereof.

The present invention is applicable in launching payloads from heavy transport aircraft, using existing techniques of fabrication of transport/launching containers and mounting members used with them.

What is claimed is:

1. An apparatus for launching heavy large payloads from an aircraft, comprising a launching container with an open end, a pneumatic expulsion device for expelling a payload from the container through the open end, and a pressurization source, the payload to be launched is located inside the launching container on mounting members that are disposed on at least two belts of the payload to be launched; wherein at least one of the mounting members being a calibrated leg, and maximum force adjustment values and admissible lateral displacements of the legs being selected so that to maintain a guaranteed clearance between the launching container and the payload when it is launched from the container; wherein the mounting members are secured on the payload to be launched, and the calibrated legs are the most distant mounting members from the open end of the launching container.

2. The apparatus of claim 1, wherein the calibrated legs comprise dynamic vibration dampers for damping dynamic vibrations of the payload to be launched when it exits the launching container.

3. An apparatus for launching heavy large payloads from an aircraft, comprising a launching container with an open end, a pneumatic expulsion device for expelling a payload from the container through the open end, and a pressurization source, the payload to be launched is located inside the launching container on mounting members that are disposed on at least two belts of the payload to be launched; wherein at least one of the mounting members being a calibrated leg, and maximum force adjustment values and admissible lateral displacements of the legs being selected so that to maintain a guaranteed clearance between the launching container and the payload when it is launched from the container; wherein the mounting members are secured on the launching container, and the calibrated legs are the mounting members located on the belts closest to the open end of the launching container.

4. The apparatus of claim 3, wherein the calibrated legs comprise dynamic vibration dampers for damping dynamic vibrations of the payload to be launched when it exits the launching container.

* * * * *